US006936219B2

(12) United States Patent
Kopeliovich et al.

(10) Patent No.: US 6,936,219 B2
(45) Date of Patent: Aug. 30, 2005

(54) LEAD-FREE ALLOY

(75) Inventors: Baruch Kopeliovich, Haifa (IL); Alberto Kaufman, Haifa (IL); Yaron Man, Qiriat Tivon (IL)

(73) Assignee: IKA Industrial Consulting Ltd., Haifa (IL)

(*) Notice: Subject to any disclaimer, the term of this patent is extended or adjusted under 35 U.S.C. 154(b) by 0 days.

(21) Appl. No.: 10/482,826

(22) PCT Filed: Jul. 7, 2002

(86) PCT No.: PCT/IL02/00531
§ 371 (c)(1),
(2), (4) Date: Dec. 31, 2003

(87) PCT Pub. No.: WO03/004713
PCT Pub. Date: Jan. 16, 2003

(65) Prior Publication Data
US 2004/0208779 A1 Oct. 21, 2004

(30) Foreign Application Priority Data
Jul. 5, 2001 (IL) .............................. 144160

(51) Int. Cl.⁷ .............................................. C22C 13/00
(52) U.S. Cl. ...................... 420/557; 420/560; 420/561; 420/562; 148/400
(58) Field of Search .................. 148/400; 420/557, 420/560, 561, 562

(56) References Cited

U.S. PATENT DOCUMENTS 2,252,409 A * 8/1941 Riesmeyer .................. 420/557
6,207,035 B1 * 3/2001 Adler et al. ................. 205/154

FOREIGN PATENT DOCUMENTS

JP          200015478        1/2000
JP         2000015478      * 1/2000

OTHER PUBLICATIONS

Wei Xiu–Qin, Huang Kui–Zhen, Zhou Lang, Effect of Microalloying on Wettability of Sn–9Zn Lead–free Solder, Electronic Components & Materials, Nov. 2003, p. 38–39, vol. 22 No. 11.
Masayuki Kitajima, Tadaaki Shono, Takehisa Ogino, et al., SnZnAl Lead Free Solder With Suppressed Oxidation Reaction, IPC/Soldertec Lead–Free Conference, Jun. 2003, 6 pages.

* cited by examiner

Primary Examiner—Sikyin Ip
(74) Attorney, Agent, or Firm—Lilling & Lilling P.C.

(57) ABSTRACT

Lead-free Tin-Zinc alloy contains Manganese in the amount of about 0.001–0.9 wt. %. The alloy is suitable for use as a solder with commercially available fluxes. Various types of solders can be prepared from the alloy, like wire, cored wire, atomized powder, solder paste, thin sheet, ribbon foil, perform etc. The alloy has improved mechanical and electrical properties in comparison with conventional Tin-Lead alloys Sn9Zn and 63Sn37Pb.

4 Claims, 18 Drawing Sheets

| Element | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Zn (wt.%) | 3.46 | 4.28 | 5.10 | 5.93 | 6.32 | 6.71 | 7.20 | 7.66 | 8.26 | 8.90 | 9.77 | 11.73 | 13.43 | 7.66 |
| Mn (wt.%) | 0.22 | 0.27 | 0.33 | 0.38 | 0.40 | 0.43 | 0.46 | 0.49 | 0.53 | 0.57 | 0.63 | 0.76 | 0.86 | - |
| Sn (wt.%) | * | * | * | * | * | * | * | * | * | * | * | * | * | * |
| Solidus Temperature (°C) | 199 | 198 | 198 | 199 | 199 | 198 | 198 | 199 | 198 | 198 | 198 | 198 | 197 | 199 |
| Liquidus Temperature (°C) | 213 | 210 | 207 | 204 | 203 | 203 | 200 | 199 | 198 | 198 | 198 | 198 | 197 | 204 |

\* rest

Fig. 1

Alloys Composition and Liquidus-Solidus Temperatures

| Element | 15 | 16 | 17 | 18 | 19 | 20 | 21 | 22 | 23 | 24 |
|---|---|---|---|---|---|---|---|---|---|---|
| Zn (wt.%) | 7.66 | 7.66 | 7.66 | 8.26 | 8.26 | 8.26 | 8.48 | 8.48 | 8.48 | 8.80 |
| Mn (wt.%) | 0.001 | 0.015 | 0.120 | 0.005 | 0.016 | 0.046 | 0.006 | 0.020 | 0.050 | 0.015 |
| Sn (wt.%) | * | * | * | * | * | * | * | * | * | * |
| Solidus Temperature (°C) | 199 | 199 | 199 | 198 | 198 | 198 | 198 | 198 | 198 | 198 |
| Liquidus Temperature (°C) | 199 | 199 | 199 | 198 | 198 | 198 | 198 | 198 | 198 | 198 |

\* rest

Fig. 2

Atomized alloys Composition and Liquidus-Solidus Temperatures

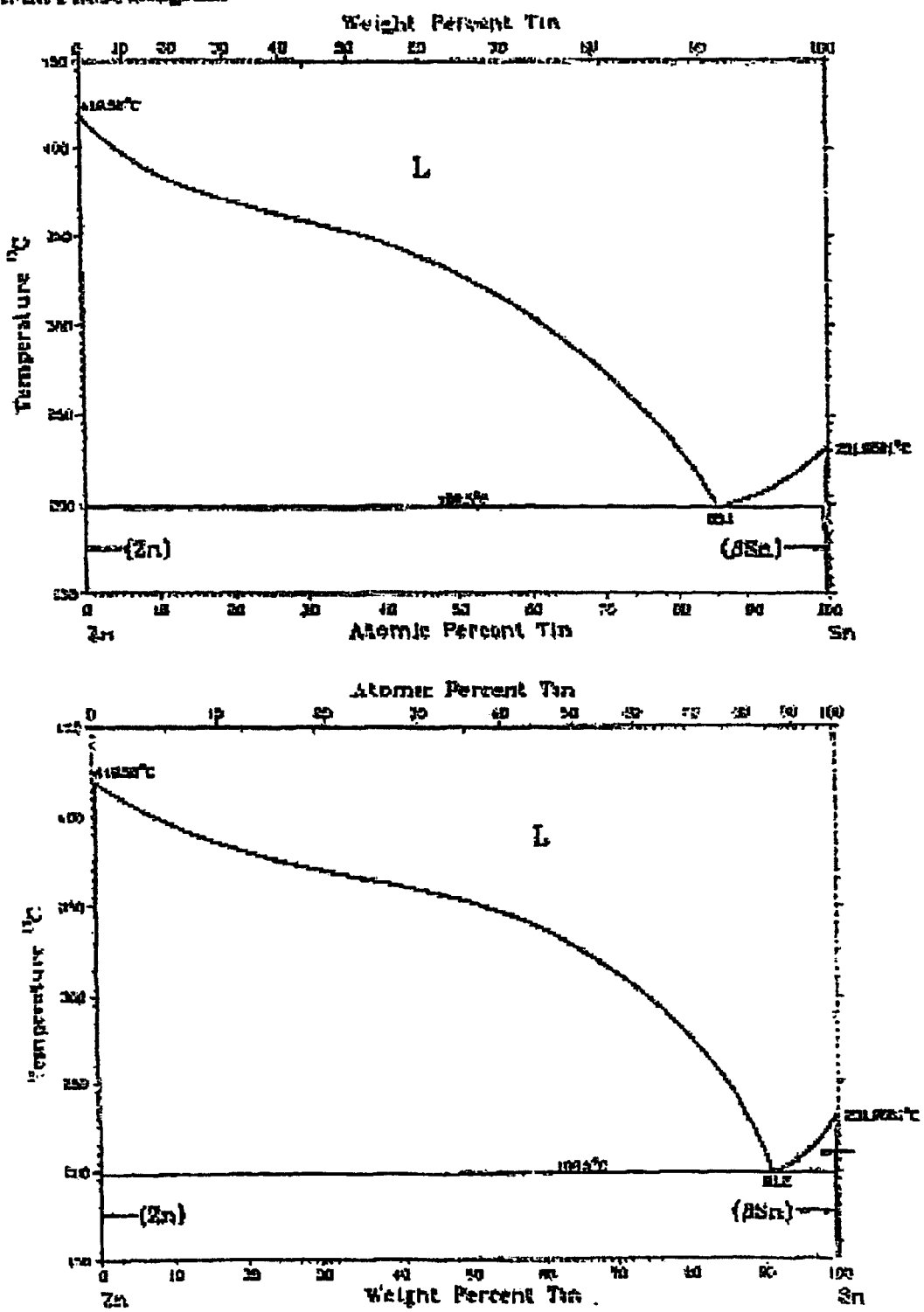
Fig.3 Binary phase diagram of tin-zinc

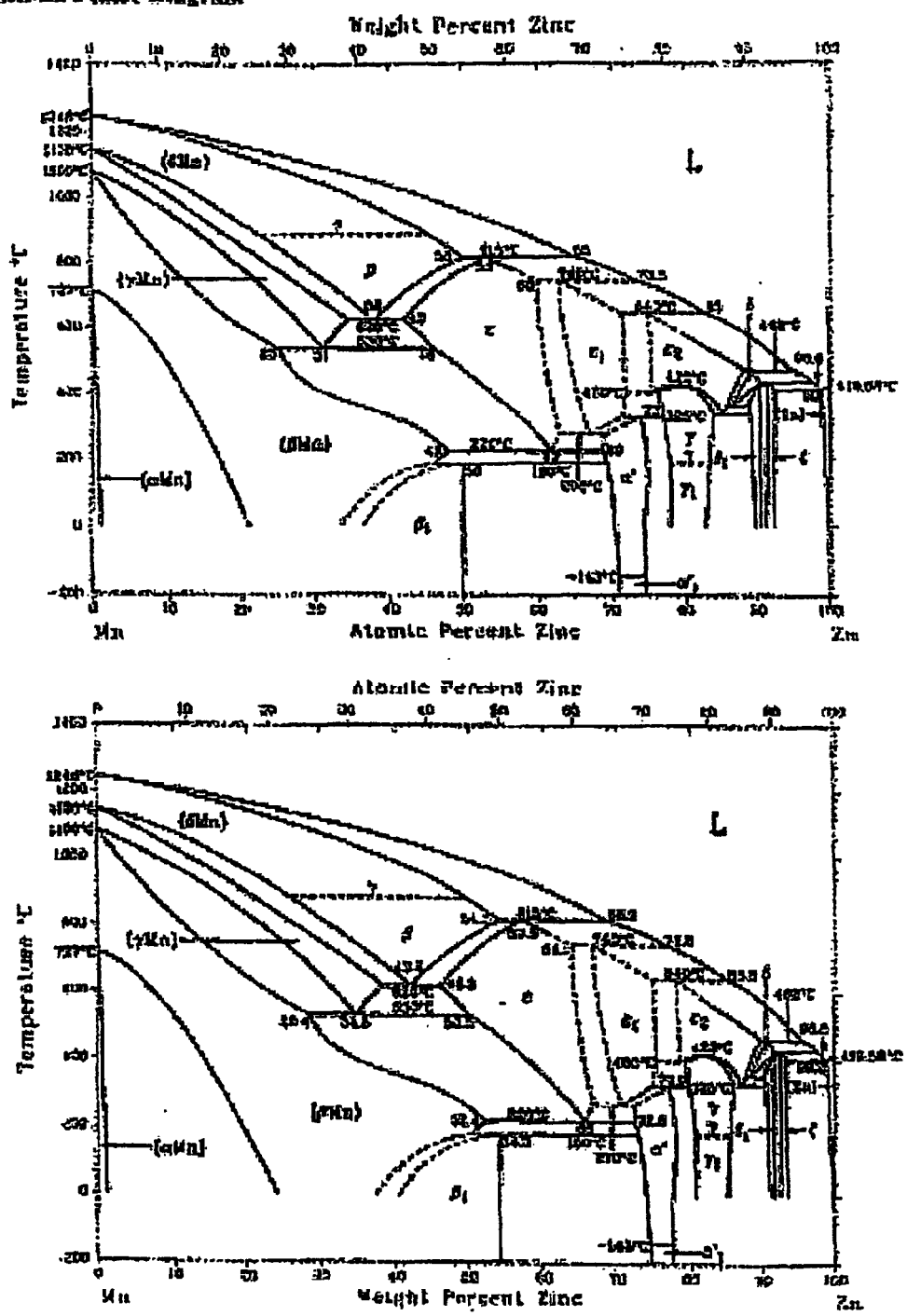
Fig. 4 Binary phase diagram of zinc-manganese

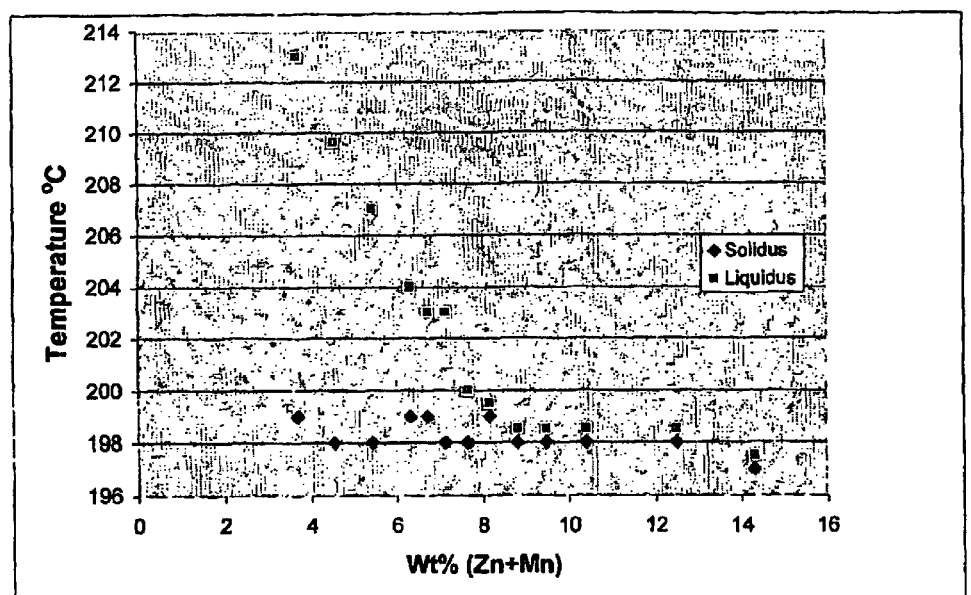
Fig. 5 Liquidus-Solidus temperature Vs weight percent of Zn + Mn

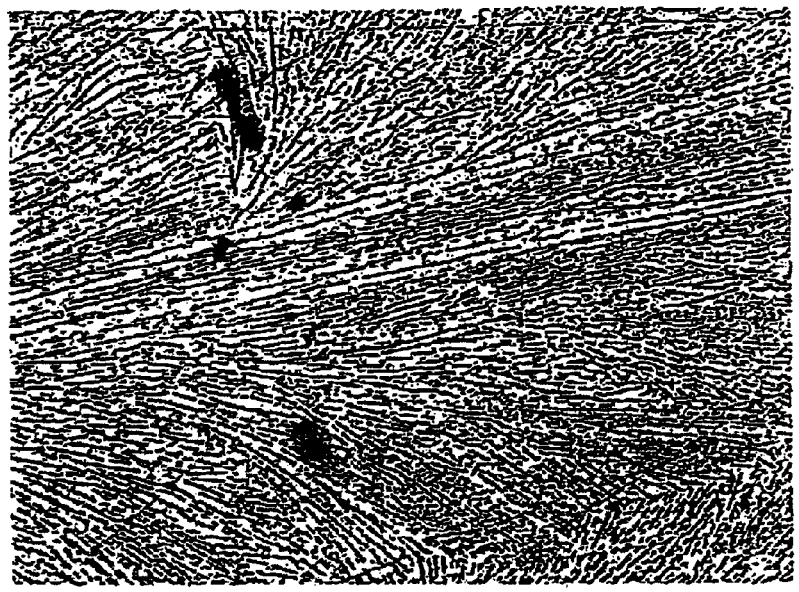
Fig. 6 Microstructure of alloy No. 8, Eutectic microstructure.
Magn. x200
Magn. x200
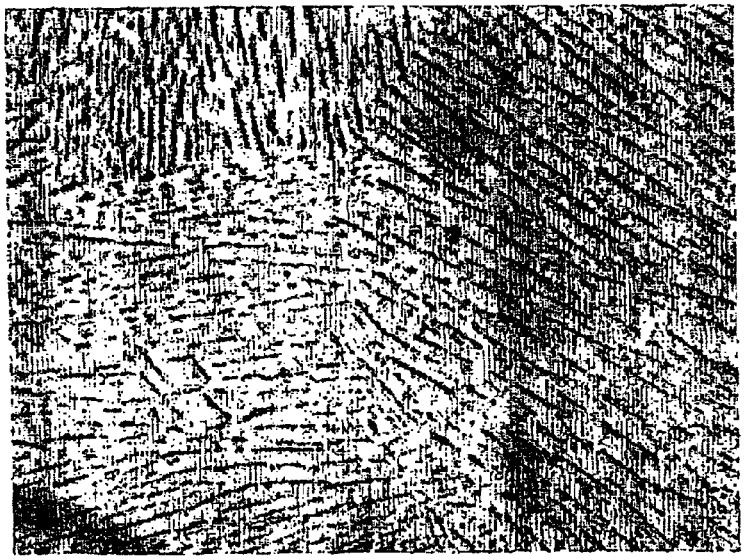
Fig. 7 Microstructure of Eutectic alloy Sn9Zn
Magn. x200

Fig. 8 Heterogenic microstructure of eutectic binary tin-zinc alloy(Sn9Zn)
Magn. x200
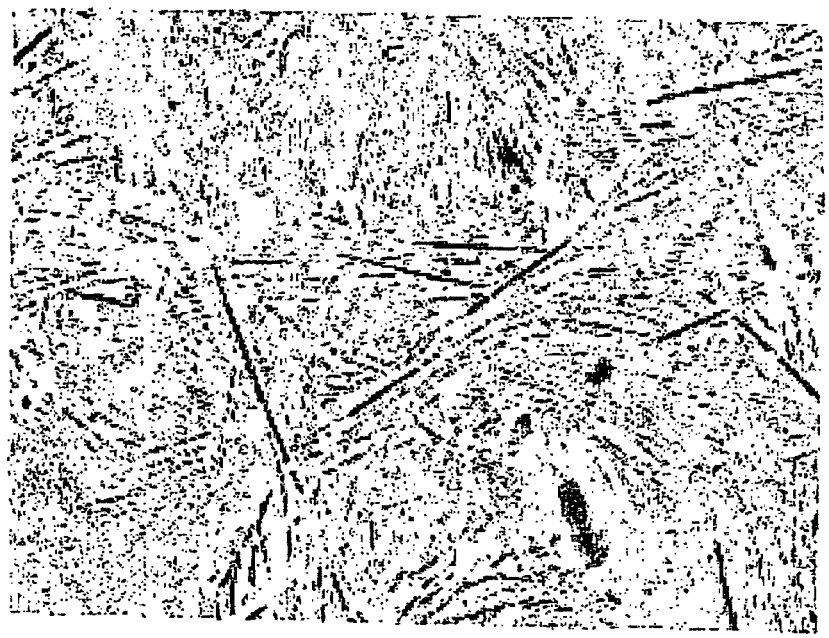
Fig. 9 Microstructure of alloy No. 10
Eutectic phase and acicular Zinc phase
Magn. x200

| Alloy | 1 | 2 | 3 | 8 | 9 | 10 | 11 | 12 | 13 | 14 | Sn₉Zn |
|---|---|---|---|---|---|---|---|---|---|---|---|
| Wetting angle (°) | 50 | 54 | 39 | 35 | 23 | 34 | 42 | 30 | 31 | 72 | 79 |

Fig. 10

Wetting angle of Tin-zinc alloys with alloying additive

| Flux type | Supplier | Grade | 1 | 2 | 3 | 4 | 5 | 6 | 7 | 8 | 9 | 10 | 11 | 12 | 13 | 14 | Sn9Zn |
|---|---|---|---|---|---|---|---|---|---|---|---|---|---|---|---|---|---|
| Rosin | AIM | RMA202 | + | + | + | + | + | + | + | + | + | + | + | + | + | + | + |
| Water Washable | Multicore | X 20 | + | + | + | + | + | + | + | + | + | + | + | + | + | ± | ± |
| | | R 103-OLI | + | + | + | + | + | + | + | + | + | + | + | + | + | ± | ± |
| | | ARAX Inorganic | + | + | + | + | + | + | + | + | + | + | + | + | + | + | + |
| No Clean | Multicore | NR 3S-04 | − | − | − | − | − | ± | ± | + | + | ± | ± | ± | ± | − | − |
| | Kester | 922 | − | − | − | − | − | ± | ± | + | + | ± | ± | ± | ± | − | − |
| VOC Free | AIM | WS 770 | + | + | + | + | + | + | + | + | + | + | + | + | + | − | − |

| + good solderability | − not solderable | ± fair solderability |
|---|---|---|

Fig. 11

Alloys behavior with different fluxes on copper substrate

| Alloy type | 1 | 2 | 3 | 4 | 5 | 6 | 7 | 8 | 9 | 10 | 11 | 12 | 13 | 14 | 63 Sn-37 Pb |
|---|---|---|---|---|---|---|---|---|---|---|---|---|---|---|---|
| Shear strength (Kg/mm²) | 1.2 | 1.6 | 1.8 | 1.7 | 1.7 | 4 | 3.0 | 2.7 | 1.4 | 1.8 | 2.3 | 2.2 | 1.5 | 1.4 | 2.1 |

Fig.12

Shear strength of copper joints (T-peel-test)

| Property | Yield strength (Kg/mm²) | Tensile strength (Kg/mm²) | Elongation % | Conductivity IACS% | Specific gravity (gr/cm³) |
|---|---|---|---|---|---|
| Alloy No. 8 | >5.3 | >6.1 | ~53 | >14 | 7.7 |
| 63 Sn - 37 Pb | - | 5.2 | 35 | 11.5 | 8.5 |

Fig.13

Physical & mechanical properties of alloy No. 8

Surface morphology of atomized powder prepared from the alloy of the invention

Auger spectroscopy measurements for locations P1 and P2

Auger Spectrum of P1

Auger Spectrum of P2

Figure 17

EDS analysis of the atomized powder surface

| Alloy | 15 | 16 | 17 | 18 | 19 | 20 | 21 | 22 | 23 | 24 | Sn₉Zn |
|---|---|---|---|---|---|---|---|---|---|---|---|
| Wetting angle (°) | 35 | 38 | 36 | 35 | 23 | 34 | 34 | 30 | 31 | 32 | 79 |

Fig. 18

Wetting angle of Tin-zinc alloys atomized powder, with alloying additive

| Flux type | Supplier | Grade | 14 | 15 | 16 | 17 | 18 | 19 | 20 | 21 | 22 | 23 | 24 | Sn9Zn |
|---|---|---|---|---|---|---|---|---|---|---|---|---|---|---|
| Rosin | AIM | RMA202 | + | + | + | + | + | + | + | + | + | + | + | + |
| Water Washable | Multicore | X 20 | + | + | + | + | + | + | + | + | + | + | + | ±  |
| | | R 103-OLI | + | + | + | + | + | + | + | + | + | + | + | ± |
| | | ARAX Inorganic | + | + | + | + | + | + | + | + | + | + | + | + |
| No Clean | Multicore | NR 3S-04 | - | - | - | - | - | ± | ± | + | + | ± | ± | - |
| | Kester | 922 | - | - | - | - | - | ± | ± | + | + | ± | ± | - |
| Voc Free | AIM | WS 770 | + | + | + | + | + | + | + | + | + | + | + | - |

| + good solderability | - not solderable | ± fair solderability |
|---|---|---|

Fig. 19

Atomized alloys behavior with different fluxes on copper substra

LEAD-FREE ALLOY

FIELD OF THE INVENTION

The present invention relates to a Lead-free Tin-Zinc alloy suitable for use as a solder. By the term "solder" here is meant a metal alloy, which when melted and applied to the joint between metal objects unites them without heating the objects to the melting point.

By virtue of the present invention the solder ensures strong and chemically stable joint between copper, brass, nickel, stainless steel and other frequently soldered metallic materials, which are used in a variety of applications including, but not limited to, electronics and general purpose soldering applications.

The advantages of the solder of the invention comparing to the known in the art Zinc-containing solders are associated with the fact that the present solder does not require active & special chemistry fluxes and therefore a wide range of commercially available fluxes including VOC free fluxes can be used with the solder of the invention.

Furthermore, the solder of the invention exhibits excellent flow and wetting behavior, and therefore is very efficient in the soldering applications, where filling of tight capillary joints as well as loose ones is required.

Moreover, the solder of the invention has improved corrosion resistance, since no corrosion of the substrate and oxidation of the present solder has been observed at the peripheral contact area between the solder and the substrate.

The Lead-free alloy of the invention has improved electrical conductivity as compared with the conventional Tin-Lead alloy (Sn63Pb37), and it has an eutectic melting point of 199° C., which is relatively similar to the melting characteristics, and is as close as possible to the melting point of conventional Tin-Lead alloy (183° C.).

The alloy of the invention consists of, in weight %, about 3% to about 13.4% Zinc, about 0.001% to about 0.9% Manganese and the balance is Tin.

Presence of Manganese in the alloy improves its oxidation resistance and corrosion resistance and also decreases the solidification range for a relatively wide range of compositions, thus rendering the manufacturing process of the alloy more flexible.

BACKGROUND OF THE INVENTION

Since the soldering industry is based mainly on the use of Tin-Lead eutectic, the obvious choice for its replacement would be a Lead-free alloy with similar melting characteristics, i.e. with the melting point, which is as close as possible to 183° C. There are available some Lead-free alloys, which have melting point in the temperature range 180–200° C. and which in general are based on a mixture of Tin with other elements such as Zinc, Bismuth and Indium. The Tin-9% Zinc alloy is the only one, which has eutectic in this temperature range, melting at 198.5° C. Examples of some other available ternary alloy are shown in the following table.

Example of Lead-free solder alloys melting at 180–200° C.

(Report of British DTI, 1999 "An analysis of the current status of Lead-free soldering")

| Alloy System | Composition (wt. %) | Melting Range (° C.) |
| --- | --- | --- |
| Sn—Zn | Sn—9Zn | 198.5 |
| Sn—Bi—Zn | Sn—87Zn—3Bi | 199–189 |
| Sn—Bi—In | Sn—20Bi—10In | 143–193 |

Unfortunately all these alloys possess certain notable disadvantages. In particular alloys with significant levels of Indium are very expensive, and are prone to the formation of a low temperature phase in the alloy. This phase melts in the region of Tin-Indium eutectic at 117° C. and causes cracking in the soldered joints. Tin-Zinc based alloys can be made with melting temperature very close to that of the SnPb eutectic, but the presence of Zinc causes many problems associated with its reactivity, i.e. soldering with these alloys requires using of special and relative active fluxes, the alloys exhibit excessive drossing and oxidation.

It should be mentioned that despite the fact that numerous Lead-free alloys for use in soldering have been devised there is still felt a need for a new and improved alloy, which is inexpensive, convenient in manufacturing and ensures efficient and reliable soldering.

THE OBJECTS OF THE INVENTION

The object of the present invention is to provide for a new and improved Lead-free alloy enabling sufficiently reduce or overcome the above-mentioned drawbacks of the known in the art solutions.

The main object of this invention is to provide for a Lead-free alloy that can be used as a solder.

The further object of the invention is to provide for a solder, which exhibits high strength and ensures chemically stable joint between soldered metallic materials, including those frequently used in the electronic industries.

Still further object of the invention is to provide for a solder, which has a eutectic melting point below 200° C. and has enhanced mechanical-physical properties as compared to the conventional Tin-Lead alloy (63Sn37Pb).

Another object of the invention is to provide for a solder, which does not require special and relative active fluxes and which is not prone to excessive oxidation.

Still further object of the invention is to provide for a Lead-free alloy, which is suitable for use as a solder in various physical forms, comprising wire, cored wire, atomized powder, paste, sheet, ribbon, foil, preform etc.

In accordance with the invention the above and other objects and advantages can be achieved with the composition of the Lead-free alloy consisting (in weight %) essentially of Tin, Zinc and up to 0.9% of Manganese.

In one of the preferred embodiments the composition of the Lead-free alloy consists (in weight %) essentially of about 3.5–13.4% of Zinc, about 0.001–0.9% of Manganese and the balance is Tin.

In still further preferred embodiment the composition of the Lead-free alloy consists (in weight %) essentially of about 7.5–8.5% of Zinc, about 0.4–0.5% of Manganese and the balance is Tin.

In yet another embodiment the composition of the Lead-free alloy consists (in weight %) essentially of about 7.5–9.0% of Zinc, about 0.001–0.15% of Manganese and the balance is Tin.

According to the additional preferred embodiment the composition of the Lead-free alloy consists (in weight %) essentially of about 8.3–8.5% of Zinc, about 0.005–0.02% of Manganese and the balance is Tin.

In still further preferred embodiment the Lead-free alloy comprises a solder, which is selected from the group consisting of wire, cored wire, atomized powder, paste, sheet, foil and preform.

For better understanding of the present invention as well of its advantages, reference will now be made to the following description of its embodiments with reference to the accompanying drawings.

BRIEF DESCRIPTION OF THE DRAWINGS

FIG. 1 shows Alloys compositions and the corresponding liquidus-solidus Temperatures.

FIG. 2 shows Atomized alloys compositions and the corresponding liquidus-solidus Temperatures.

FIG. 3 is binary phase diagram of Tin—Zinc.

FIG. 4 is binary phase diagram of Manganese—Zinc.

FIG. 5 is dependence of Liquidus-Solidus temperature of the present alloy on the amount of Zn and Mn.

FIG. 6 shows the microstructure of alloy No. 8.

FIG. 7 shows the microstructure of conventional eutectic alloy Sn9Zn.

FIG. 8 shows the heterogenic microstructure of conventional eutectic alloy Sn9Zn.

FIG. 9 shows the microstructure of alloy. No. 10.

FIG. 10 shows wetting angles of various compositions of the present alloy and of the conventional Tin—Zinc based alloy.

FIG. 11 illustrates behavior of various compositions of the present alloy with different fluxes on copper substrate.

FIG. 12 shows shear strength of copper joints measured by T-peel-test.

FIG. 13 depicts physical & mechanical properties of the composition No. 8.

FIG. 17 shows results of the EDS analysis made on the surface of the atomized powder.

FIG. 18 shows wetting angles of various compositions referring to atomized powder.

FIG. 19 illustrates soldering behavior of the compositions referring to atomized powder.

DETAILED DESCRIPTION OF THE INVENTION

Figure 14:
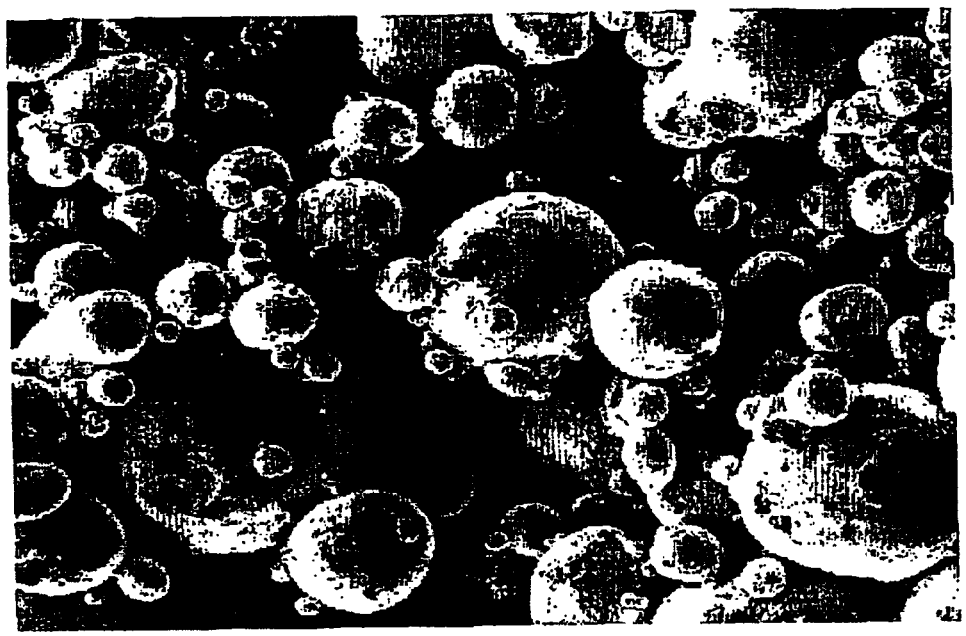
FIG. 14 shows surface morphology of the present alloy manufactured in the form of atomized powder.

It has been unexpectedly experimentally revealed, that various compositions based on Tin—Zinc alloy, which contain small alloying addition, mainly Manganese (Mn), have improved properties that render the alloy very suitable and efficient for use in soldering in electronics, automotive industries and in general purpose soldering applications.

In general the present invention concerns an alloy consisting essentially of, in weight %:

Zinc (Zn)—about 3.4% to about 13.4%.
Magnaese (Mn)—about 0.001% to about 0.9%.
Tin (Sn)—balance.

Lead-free alloy of the invention can be prepared by any technique, which effectively mixes the alloy constituents taken in amounts referring to compositions, which will be shown further. Such techniques include, but are not limited to, melting a mixture of elements or partially alloyed elements, preferably in an inert atmosphere.

The different compositions of the present alloy are summarized in FIGS. 1 & 2, which respectively refer to two different groups of embodiments.

The first group of embodiments, i.e. the compositions No. No. 1–13 refer to those alloy compositions, which are suitable for manufacturing of solders at a low cooling rates, namely in the order of magnitude of not more than 1 degree C. per second. The soldiers manufactured from these compositions at low cooling rates are in a stable condition. Among such solders are wires, ingots, sheets, foils, ribbons, preforms, etc.

The second group of embodiments, i.e. the compositions No.No.15–24 refer to those alloy compositions, which are suitable for manufacturing of solder at a high cooling rate, namely in the order of magnitude of at least 10 degrees C. per second. The solders prepared at high cooling rate from the compositions of the second group are in a metastable condition. In particular these compositions is suitable for manufacturing the solder in the form of atomized powder. The atomized powder can be also used for preparation of soldering paste.

Now with reference to FIGS. 5–9 the microstructure characteristics and the liquidus-solidus temperature of the compositions referring to the first group of embodiments will be explained.

As seen in FIG. 3 the binary Tin-Zinc alloy has a eutectic melting temperature of 198.5° C. Small amounts of Manganese and Zinc taken at a constant ratio of 1 atom of Manganese to 13 atoms of Zinc were added to Tin. The selected ratio corresponds to the stoichiometric ratio between Manganese and Zinc in the ξ phase presenting in the Mn—Zn phase diagram as shown in FIG. 4.

With reference to FIG. 5 the presence of Manganese decreases the liquidus-solidus temperature and it can be seen that the temperature range corresponding to the alloy compositions No.No.1–13 (3.5–13.5% wt of Zinc) is about 198° C. The data, presented in FIG. 5 lies within the accuracy of the DTA measurements, which is ±0.75° C. According to the DTA measurements, the alloy compositions No.No.7–13 can be defined as pseudo eutectic compositions.

For the purpose of accurate determination of the eutectic melting point, a metallographic examination of the compositions No.No.1–13 has been carried out. Referring now to FIG. 6 it is seen that the composition No.8 has the most homogenous eutectic microstructure. For the purpose of comparison, metallographic specimens of the conventional binary Sn-9Zinc alloy (eutectic composition) and Tin-Zinc-Manganese alloy of the invention with the same Zinc content were prepared.

As seen in FIGS. 7–9 the microstructure of the binary eutectic alloy is not homogenous and the microstructure of the ternary alloy consists of a eutectic phase and acicular phases of Zinc.

By adding of about 0.5% wt of Manganese, the eutectic composition of binary Tin—Zinc alloy has been shifted to the content of 7.7–8.3% wt of Zn.

By virtue of the addition of Manganese in the amount of about 0.5% wt it was possible to reduce the liquidus temperature without changing the eutectic temperature (see FIG. 5) and thus to create a range of Tin-Zinc compositions (compositions No.No.8–13).

The wetting capability of the new alloy was examined with reference to the conventional eutectic Tin-Zinc alloy (Sn9Zn).

The wetting examination was carried out on a copper substrate etched by nitric acid (50%) and sulfuric acid (5%). The examination has been carried out at 70° C. by dipping in the VOC Free WS770 flux.

The substrate was heated by an electrical plate to a temperature of 230° C., after which a few alloy particles were put on the substrate until creating a melting pool.

After cooling down, metallographic specimens were prepared and wetting angle between the drop and the substrate was measured.

In FIG. 10 the wetting angles of different compositions of the new alloy as well of the eutectic Tin-Zinc alloy (Sn9Zn), are shown.

The wetting angles of the most alloy compositions are good (<45°) and better than the wetting angle of the eutectic alloy (Sn9Zn).

The solderability evaluation of the compositions referring to the present alloy has been carried out on various substrates and with different fluxes. Results of the evaluation are summarized in FIG. 11. From the results follows, that:

- all compositions exhibit good solderability on a copper substrate with the Rosin RMA202 flux
- all composition except the composition No. 14 and the binary alloy Sn9Zn exhibit good solderability on a copper substrate with the Water Washable X20 flux and R103-OLI flux. The composition No. 14 and the binary alloy Sn9Zn exhibit fair solderability on a coper substrate with the Water Washable ARAX Inorganic flux
- the compositions No.No.6–13 exhibit either good or fair solderablity on a copper substrate with the No Clean fluxes
- all composition except the composition No.14 and the binary alloy Sn9Zn exhibit good solderability on a copper substrate with the VOC free flux.

It has been also found, that in contrast to the binary Sn9ZN alloy the compositions of the invention could be soldered on a nickel substrate with the fluxes, from the group of Rosin, VOC and Water Washable fluxes and on a stainless steel substrate using the Water Washable ARAX flux.

According to the above results, it can be clearly seen that the present alloy has the required properties enabling its use as a solder.

In order to evaluate the advantages of the new alloy, as compared to the other conventional Tin-Lead alloy some mechanical properties and electrical conductivity of the composition No.8 were examined. In FIG. 13 the measured properties of the present alloy are compared with the data published in the Metals Handbook (pub. by ASM $10^{th}$ Ed., V6 p. 966–967) for the conventional alloy 63Sn37Pb alloy. It can be readily appreciated, that the mechanical and electrical conductivity properties of the new alloy are better than those of the conventional Tin-Lead alloy.

Specimens for shear strength testing of the soldered joint were prepared from the compositions of the invention and from the conventional 63Sn37Pb alloy.

The specimens were prepared and tested according to the ASTM D1876 standard (Standard Test Method for Peel Resistance of Adhesive, T-peel test).

The obtained results are shown in FIG. 12 and it can be seen, that shear strength of joints referring to the compositions No.No.7, 8, 11 and 12 is higher than of the joint obtained with conventional Tin-Lead alloy.

Now the compositions of the second group of embodiments will be disclosed.

By using an atomizing process with a high cooling rate it is possible to prepare the alloy in a metastable condition and in the form of a powder. An example of such a powder is shown in FIG. 14, depicting the morphology of the atomized powder prepared from the composition No.22.

It has been found, however, that the wetting properties and solderability properties of the atomized powder are deteriorated due to the precipitation of Manganese and therefore its content should be reduced, comparing to the compositions of the first group, which were prepared at a low cooling rate and are in a stable condition.

To prove this assumption the atomized powder was examined by the Auger spectroscopy and by the EDS analysis.

Figure 15:
FIG. 15 is Auger micrograph for locations P1 and P2 of alloy No. 22.
Figure 16A:
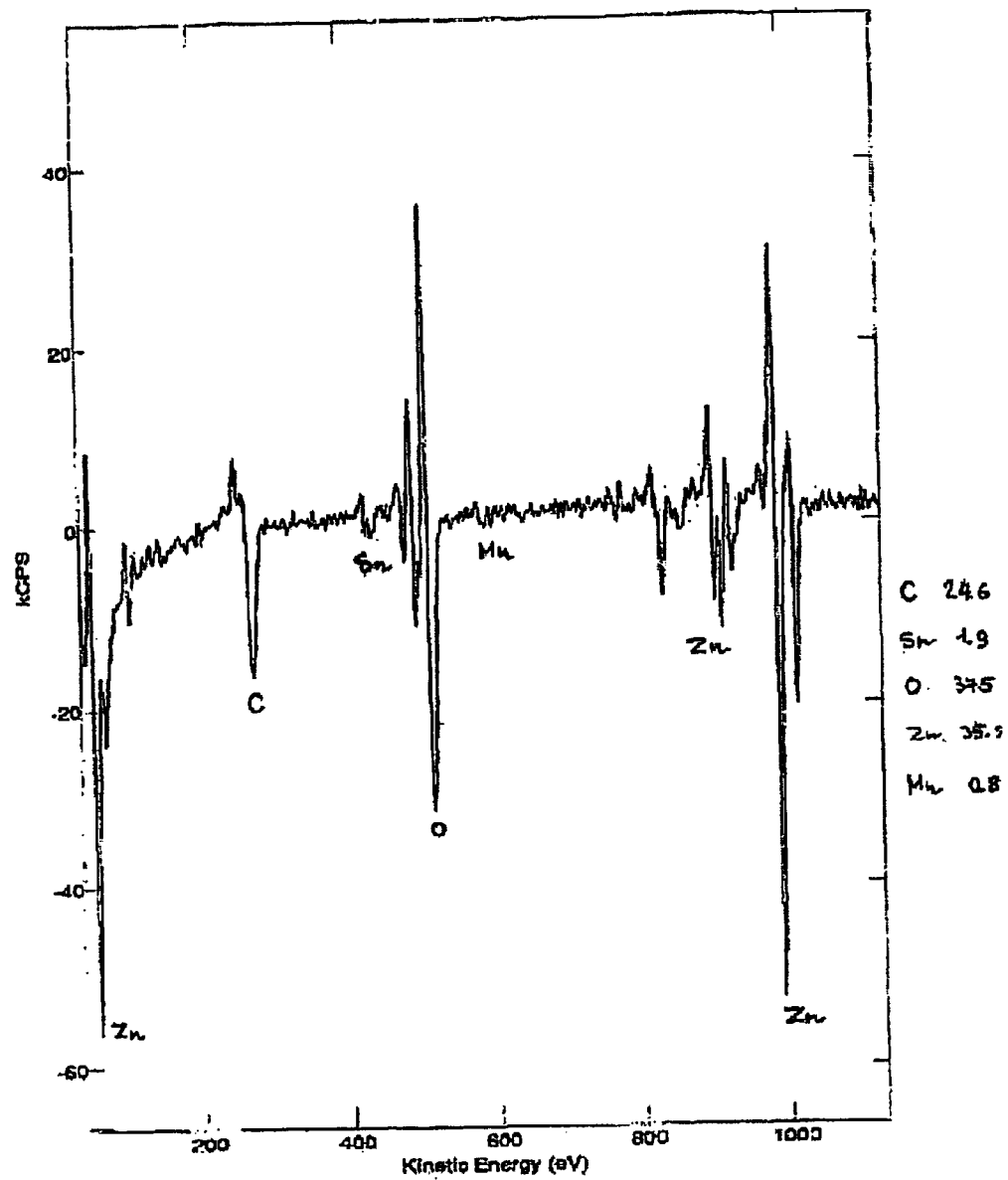
FIG. 16a shows Auger spectrum for location P1.
Figure 16B:
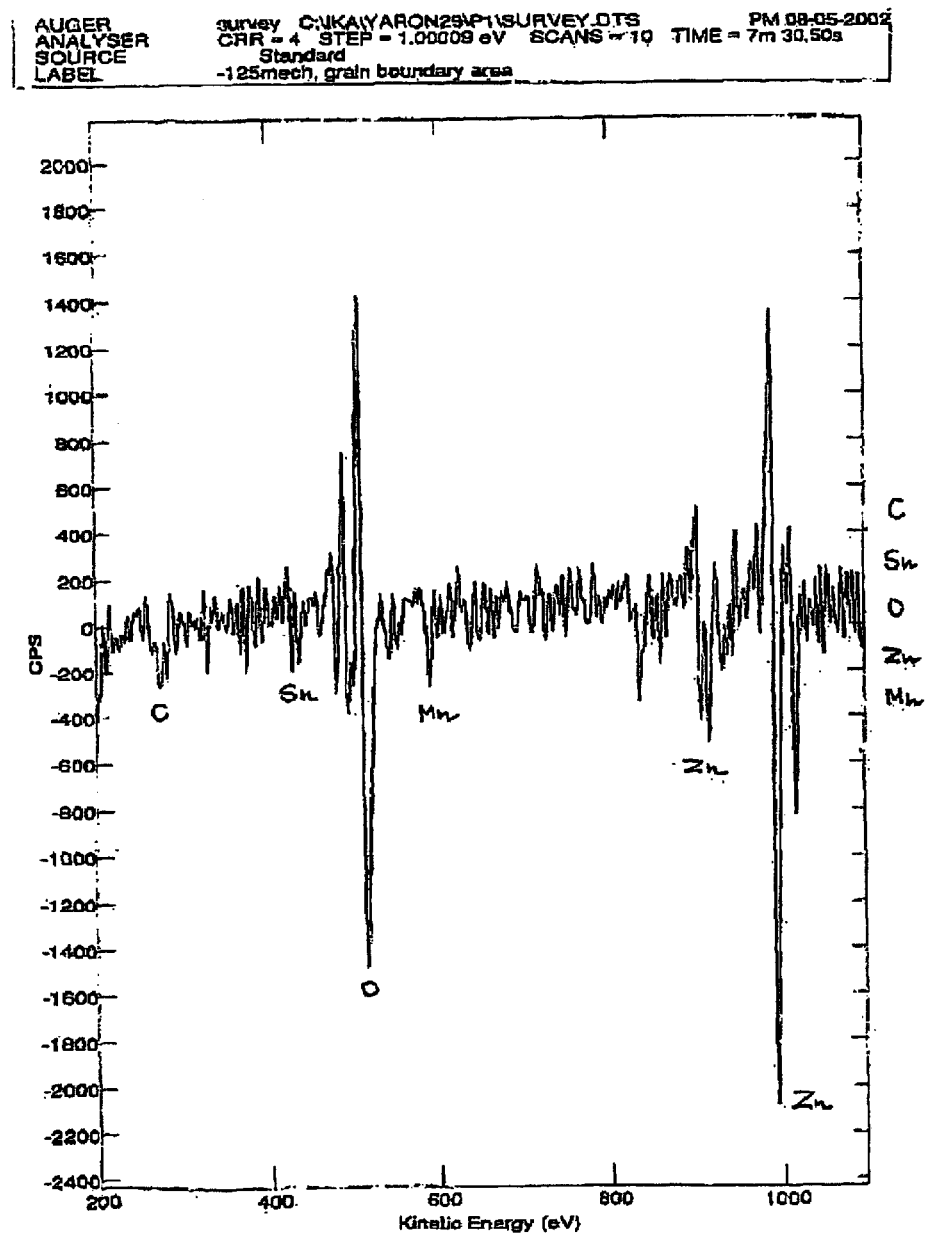
FIG. 16b shows Auger spectrum for location P2.

As best seen in FIG. 14 the surface morphology of the powder particles is defined by a "grained" texture. In FIG. 15 are seen two locations on the powder particle, designated as P1 and P2 and referring respectively to the "grain" itself and to the "grain boundary". The content of Manganese in both locations was measured by the Auger spectroscopy. The results are seen in FIGS. 16a, 16b. From the results follows, that the content of Manganese in the above locations (in atomic %) is 0.8 and 4.4 respectively. It should be noticed that the atomic absorption analysis had shown that the composition No.22 contains only 23 ppm of Manganese.

Figure 17:
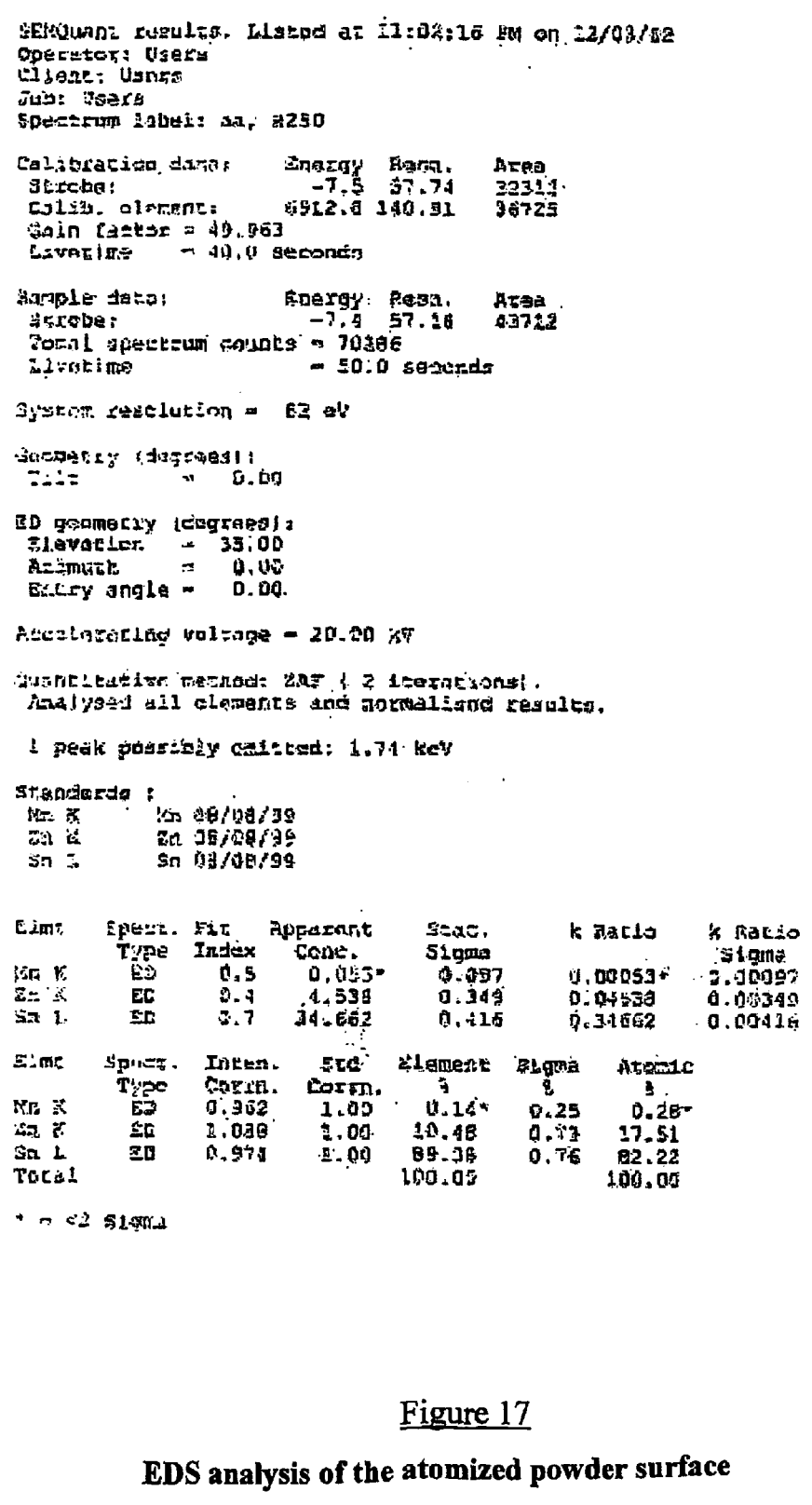

Results of the EDS analysis of the powder surface are shown in FIG. 17. The analysis has been carried out with the excitation volume depth 5 micron. The analysis hadn't revealed any sign of Manganese at all.

From the obtained results follows that in the alloy, which is produced at a high cooling rate and is in a metastable condition the precipitation of Manganese occurs mostly on the particles surface and not in the bulk as in the case of an alloy produced at a slow cooling rate. Therefore it would be sufficient if the Manganese content in the solders produced at a high cooling rate is less comparing with the solders produced at a low cooling rate. We found that the Manganese content of about 0.001–0.15% would be a sufficient range.

In FIG. 18 are shown wetting angles of different compositions of the present alloy prepared in the form of atomized powder and of the conventional eutectic Sn9Zn alloy. It can be readily appreciated that wetting characteristics of the present alloy are better than of the conventional alloy.

Results of the solderability evaluation of the atomized alloys on copper substrate, with different fluxes are summarized in FIG. 19. It can be seen that all compositions exhibit good solderability with the Rosin, Water Washable and VOC fluxes. The compositions NoNo.19–24 exhibit either good or fair solderability with the No Clean fluxes.

Two solder pastes were prepared from the atomized powder of the composition No.22 mixed with a flux paste medium. The flux paste medium in the first paste was RMA 291 flux and in the second paste NC 291 AX. The pastes were printed on a PCB that was soldered through a reflow oven. The reflow profile was a conventional one with the peak temperature of 235° C. The solder pastes exhibited good wetting and solderability characteristics.

SUMMARY

It is evident that the present alloy has improved properties in comparison with the conventional eutectic Tin-Zinc alloy (Sn9Zn) and can be used as a solder.

By virtue of the improved properties it is possible to use the present alloy with different types of commercial fluxes and no sign of corrosion and oxidation is observed in the soldered assembly parts.

The new alloy also has improved mechanical and electrical properties as compared to the conventional Tin-Lead alloy (63Sn37Pb).

The solder of the invention is amenable to manufacture as a solid round wire and is also suitable for solder wire cored with the Rosin or other commercially available organic or inorganic fluxes.

The solder can also be manufactured in other physical forms, like thin sheet, foil, ribbon, preforms or atomized powder, suitable for mixing with a flux to provide a solder paste.

It should be appreciated that the present invention is not limited by the above described embodiments and that one ordinarily skilled in the art can make changes and modifications without deviation from the scope of the invention as will be defined below in the appended claims.

For example, despite the alloy has been disclosed in the foregoing description in connection with the soldering application, nevertheless the other applications of the alloy should be considered also within the scope of the invention. Examples of such alternative applications are manufacturing of coatings on cans made of stainless steel, copper based alloys etc., casting or powder metallurgy manufacturing of small details for electronic industry etc.

It should also be appreciated that features disclosed in the foregoing description, and/or in the foregoing drawings, and/or examples, and/or tables, and/or following claims both separately and in any combination thereof, be material for realizing the present invention in diverse forms thereof.

When used in the following claims the terms "comprise", "contain", "have" and their conjugates mean "including but not limited to".

What is claimed is:

1. A lead-free alloy consisting (in weight %) essentially about 7.5–9.0% of Zinc, about 0.001–0.02% of Manganese and the balance is Tin.

2. The lead-free alloy as defined in claim 1, said alloy comprising a solder.

3. The lead-free alloy as defined in claim 2, in which said soldier is selected from the group of wire, cored wire, atomized powder, paste, sheet, foil and perform.

4. The lead-free alloy as defined in claim 1, consisting (in weight %) essentially about 8.3–8.5% of Zinc, about 0.005–0.02% of Manganese and the balance is Tin.

* * * * *